United States Patent

[11] 3,540,672

| [72] | Inventor | George H. Odom<br>208 Tuna, Galveston, Texas 77550 |
|---|---|---|
| [21] | Appl. No. | 742,998 |
| [22] | Filed | June 3, 1968<br>Continuation-in-part of Ser No.<br>646,818, June 19, 1967, abandoned |
| [45] | Patented | Nov. 17, 1970 |

[54] FISHING REELS
11 Claims, 8 Drawing Figs.

[52] U.S. Cl. ..................................................... 242/84.2
[51] Int. Cl. ............................................... A01k 89/00
[50] Field of Search ........................................... 242/84.2,
84.2B, 84.2C, 84.2D, 84.21, 84.52

[56] References Cited
UNITED STATES PATENTS

| 2,590,369 | 3/1952 | Beeler | 242/84.2(D) |
| 2,621,869 | 12/1952 | McCash | 242/84.2)C) |
| 2,652,211 | 9/1953 | Hanse | 242/84.21 |
| 2,796,224 | 6/1957 | Jefferson | 242/84.2(B) |
| 2,798,679 | 7/1957 | Grosh | 242/84.21 |
| 2,866,291 | 12/1958 | Duell | 242/84.2(D)X |
| 3,370,806 | 2/1968 | Odom | 242/84.2(D) |

*Primary Examiner*—Billy S. Taylor
*Attorney*—M. N. Cheairs

ABSTRACT: A fishing reel which acts as a drum type reel on rewinding and a spinning type reel for casting, the reel including a reel frame adapted for attachment to a fishing rod, a spool rotatably connected at one end only to the reel frame and a casting adapting means adjacent the free end of the spool, the casting adapting means providing an eyelet for passage of fishing line therethrough on casting, the front side of said eyelet being movably responsive to fishing line pressure as such fishing line is swept from normal line path into contact with said front side of said eyelet, thereby permitting fishing line to be swept into said eyelet, and means for locking said front side to prevent removal of fishing line from said eyelet until said locking means is released.

Patented Nov. 17, 1970

INVENTOR.
GEORGE H. ODOM
BY
M. N. Chains
ATTORNEY

INVENTOR
GEORGE H. ODOM

FISHING REELS

BACKGROUND OF THE INVENTION

The present application is a continuation-in-part of U.S. Pat. application Ser. No. 646,818, filed June 19, 1967, now abandoned.

1. Field of the Invention

The present invention relates to fishing reels, more particularly, the present invention relates to a dual purpose fishing reel which combines features of the drum type reels and the spinning type reels.

2. Description of the Prior Art

With drum type fishing reels of the kind in general use, the fishing line is wound on a spool which is disposed substantially crosswise or perpendicular to the axis of the rod on which the reel is mounted. The primary advantage of the drum type reel is the considerably greater rewinding strength which allows for heavy objects on the end of the fishing line to be wound in to the fisherman. However, the drum type reel suffers at least two significant disadvantages. When casting with this type of reel, the spool must rotate to allow the fishing line to unwind. The friction resulting from rotation of the spool significantly reduces the distance which the fishing line can be cast. In addition, when the fishing line ceases to be carried outward by the cast, it is quite difficult and requires considerable skill to keep the rotating spool from continuing to rotate and thus, overrun the cast. Such overrunning by the spool results in "backlash".

The spinning type of fishing reel provides for the fishing line to spin or be stripped off of an end of the spool, generally, with the spool remaining stationary. Usually, the axis of the spool of the spinning type reel is substantially parallel to the rod to which the reel is attached. The spinning type reels have, to a large extent, overcome the problem of backlashing and have significantly lengthened the distance which a fishing line can be cast. However, the spinning reel lacks much of the pulling strength which, as noted above, is characteristic of the drum type reel.

There have been a number of attempts at designing a fishing reel combining the best features of the drum and spinning type reel, particularly the rewinding strength of the drum type reel with the casting advantages of the spinning type reels. One means proposed for combining these advantages of the drum and spinning type reels is a reel which rotates with relation to the rod to which it is attached such that on casting the axis of the spool is substantially parallel to that of the rod while on rewinding of the line, the reel is rotated back to the customary position wherein the axis of the spool is perpendicular to that of the rod. While such reels as this afford to some degree a successful combination of the advantages of the drum and spinning type reels, they have found slight acceptance by fishermen.

Another type of reel proposed for combining the features of the drum and spinning type reel is that wherein the fishing line is spun or stripped off the end of the spool during casting at a substantially right angle to the axis of the rod and in substantial alignment with the axis of the spool but is rewound perpendicular to the axis of the spool and in alignment with the axis of the rod. Among the reels of this type are those having one end of the spool unsupported and unattached to allow the fishing line to spin off the end of the spool and having a fixed line guide means in substantial alignment with the axis of the spool. The fishing line passes around this fixed line guide means on casting. With such reels, as presently known, the fishing line is picked up with one hand by the fisherman and placed over and behind the line guide means, generally, within a retaining loop or eye, prior to casting, and then removed from behind the line guide means after the cast is complete and prior to rewinding. While many of such reels intend the fisherman to again pick up the line with one hand to remove such line from the line guide means upon completion of the cast, at least one of such reels provides for the line guide means to have a lever as a part thereof whereby the lever may be rotated to a point where the fishing line will slip off of the line guide means and return to alignment with the axis of the rod for rewinding. This type of reel is described in U.S. Pat. No. 2,798,679. However, the release of the fishing line from the line guide means is not instantaneous because of the drag of the line along the surface of the end of the lever as it rotates. Also, it is still necessary with this type of reel for the fisherman to pick up and carefully thread the fishing line into the line guide means. Therefore, while this type of reel represents an improvement in the action of removing fishing line from the line guide means after casting, there is still a need for additional improvement in this type of convertible fishing reels.

3. Objects

It is an object of the present invention to provide a fishing reel which combines features of the drum type and spinning type fishing reels. Another object of the present invention is to provide a fishing reel possessing characteristics of both the drum type and the spinning type reels which may be rapidly and simply converted from operation as a spinning type reel to a drum type reel and vice versa. It is also an object of the present invention to provide a fishing reel which may be quickly and easily adjusted so that all movement of the fishing line onto the spool is effectuated by rotation of the spool or so that movement of the fishing line from the spool is off of an end of the spool without rotation thereof. A further object of the present is to provide a fishing reel which may be operated as a drum type reel during the rewinding of the fishing line and as a spinning type reel during casting which reel provides for the fishing line to be easily moved from the rewind position to the casting position without picking up the line and threading it into a line guide means and for the fishing line to be returned to the rewind position from the casting position simply and rapidly. Additional objects of the present invention will become apparent from the following description of the invention herein disclosed.

SUMMARY OF THE INVENTION

The present invention which fulfills the above and other objects, is a fishing reel comprising a reel frame adapted for attachment to a fishing rod, a spool rotatably attached at one end thereof to said reel frame, means for rotating said spool, and a casting adapting means adjacent the free end of said spool, said casting adapting means comprising a generally U-shaped base plate opening toward the front of said fishing reel, a line restraining means connected in movable relationship with said base plate and lying across the opening of said base plate, said line restraining means movably responsive to fishing line pressure against a front or leaving edge thereof such as to permit entry of said fishing line into said base plate and behind said line restraining means, means for locking said line restraining means against movement resulting from fishing line pressure against a back edge thereof, means for releasing said means for locking said line restraining means to permit said line restraining means to allow said fishing line to leave said casting adapting means to allow said fishing line to leave said casting adapting means and return to normal rewinding line path.

By means of the present invention, a fishing reel may be rapidly and simply converted from a drum type reel to a spinning type reel for casting and back again. This may be accomplished by the present invention without requiring the fisherman to pick up the fishing line with his fingers and insert it into the line guide means which is in alignment with the axis of the spool and then again pick up the fishing line and remove it from the line guide means after completion of the cast. Further, there is less chance of fouling the fishing line on casting with the fishing reel of the present invention. Also, the fishing line cannot escape from the line guide means or, as referred to herein, the casting adapting means, until released by the fisherman.

DESCRIPTION OF THE DRAWINGS

The accompanying drawings illustrate various embodiments of the present invention and details therefor.

DESCRIPTION OF THE PREFERRED EMBODIMENTS

Figure 1:
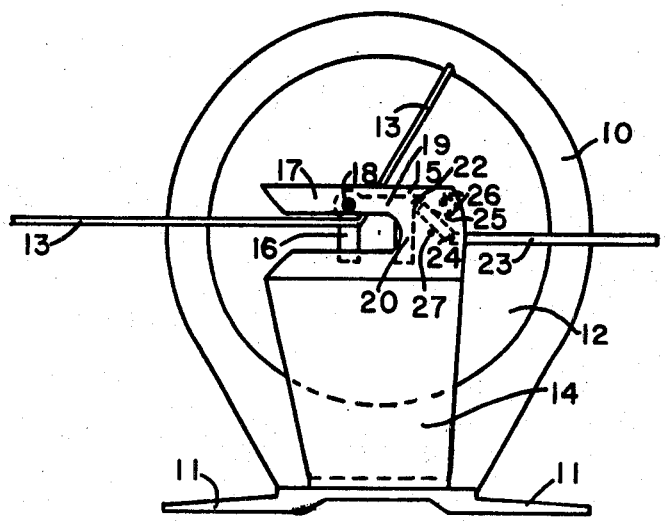
FIG. 1 is a side elevational view of an embodiment of the fishing reel of the present invention.

To describe the preferred embodiments of the present invention, reference is made to the accompanying drawings. In the drawings, like characters are used throughout to denote corresponding parts.

Referring to the drawings, a fishing reel is shown including a reel frame formed by a side plate 10 and a reel seat plate 11 by means of which the fishing reel is secured in position on a fishing rod. Within the reel frame is disposed a spool 12 which is rotatably connected at one end thereof to side plate 10. The other end of spool 12 is not attached to the reel frame. Upon spool 12, fishing line 13 is wound.

For casting, a casting adapting or line guide means is connected to reel seat plate 11 by means of a bracket 14 and is located adjacent the unattached or free end of spool 12. The casting adapting means includes a generally U-shaped casting base plate 15 attached to bracket 14 and a line restraining means or casting dog. The slot formed within base plate 15 opens toward the front of the fishing reel, the slot lying substantially parallel with the axis of the fishing rod. In the embodiment of the present invention illustrated in FIGS. 1 through 6, casting dog 16 also is generally U-shaped. However, as is apparent from the embodiment shown in FIGS. 7 and 8, the casting dog of the casting adapting means of the present invention may be of other shapes.

Referring first to the embodiment illustrated in FIGS. 1 through 6, the U-shaped casting dog 16 is rotatably attached to base plate 15 on a leg 17 thereof by means of a pin 18. While the U-shaped casting dog is shown as connected to the upper of leg 17, it is within the scope of the present invention that it be attached to either of the two legs 17. Base plate 15 may comprise two substantially similar U-shaped plates with casting dog 16 being attached between such two plates.

The positioning of casting dog 16 with respect to casting base plate 15 is such that when casting dog 16 is in the open position, the legs thereof are in substantial alignment with the legs of casting base plate 15. Also, the base segment 19 of casting dog 16 will lie forward of the base segment 20 of casting base plate 15 when casting dog 16 is in the open position to an extent such that as fishing line 13 is swept into the opening formed by legs 17 of casting base plate 15, the line 13 will strike the base segment 19 and cause rotation of casting dog 16 to the closed position. Additionally, the positioning of both casting base plate 15 and casting dog 16 is such that the eye formed by the closed position of casting dog 16 is in substantial alignment with the axis of spool 12.

Figure 2:
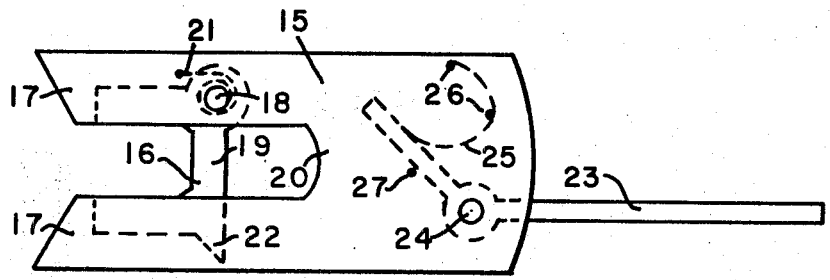
FIG. 2 is a side elevational view of an embodiment of the casting adapting means of the reel of the present invention illustrating the casting adapting means in noncasting position.
Figure 3:
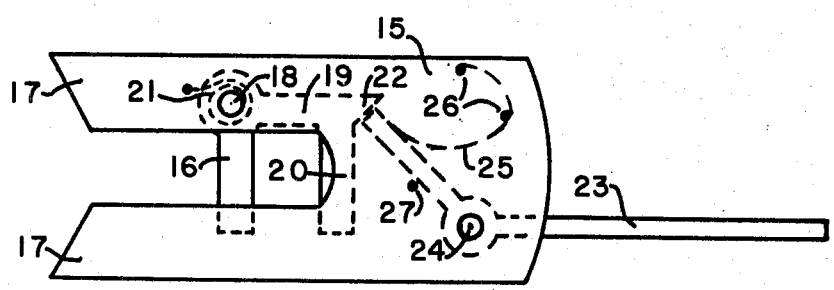
FIG. 3 is a side elevational view of the embodiment of the casting adapting means of the reel of the present invention shown in FIG. 2 illustrating the casting adapting means in casting position.
Figure 4:
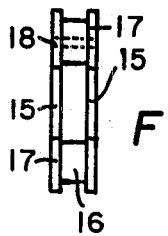
FIG. 4 is a front elevational view of the casting adapting means of the reel of the present invention with the casting adapting means in a noncasting position.
Figure 5:
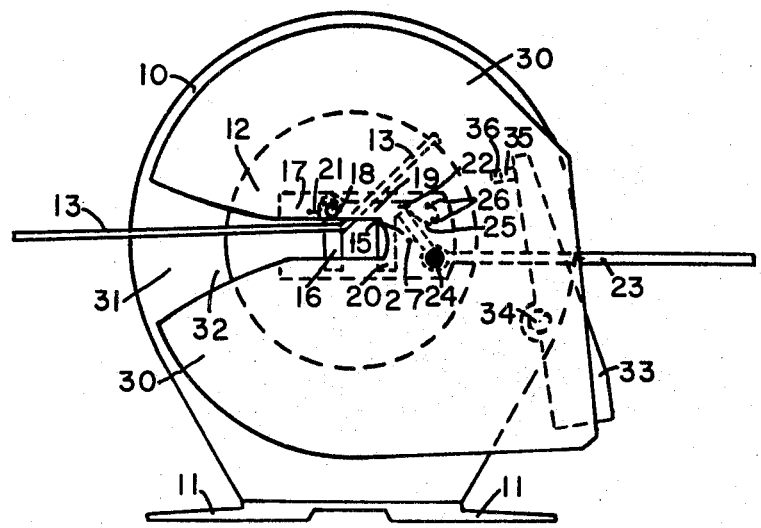
FIG. 5 is a side elevational view of another embodiment of the fishing reel of the present invention.

A tension producing means 21, usually a strip of spring metal, is provided wound around pin 18 and in contact with casting dog 16 in a manner such as to force casting dog 16 to rotate on pin 18 into substantial alignment with casting dog plate 15 which is the open position shown in FIG. 2. A lug 22 projects from base segment 19 to provide for a dog release lever 23 to engage and hold casting dog 16 in closed position as shown in FIGS. 1, 3 and 5. While lug 22 is illustrated as projecting from base segment 19, it may project from any other convenient segment of casting dog 16.

Lever 23 is pivotally attached to casting base plate 15 by means of a pin 24. To force lever 23 into engagement with lug 22 of casting dog 16, a second tension producing means 25 is provided. Second tension producing means 25 which usually is a strip of spring metal, is held in place by bars 26 which are fixedly attached to casting base plate 15. The direction of pivotal motion induced in lever 23 by second tension producing means 25 is such as to move an end of lever 23 into engagement with lug 22 when casting dog 16 is in a closed position, thereby preventing rotation of casting dog 16 to the open position. Second tension producing means 25 may be in contact with lever 23 on either side of pin 24 and may apply tension by "push" or "pull", choice being primarily a matter of convenience and practicality.

A stop pin 27 is fixedly attached to casting base plate 15 and extends therefrom adjacent lever 23 for the purpose of limiting the pivotal motion of the lug engaging end of lever 23. Stop pin 27 serves to prevent lever 23 from being rotated by second tension producing means 25 to such an extent that it will not contact and be moved by rotation of casting dog 16 into engagement with lug 22 as casting dog 16 rerotates to the closed position.

Figure 6:
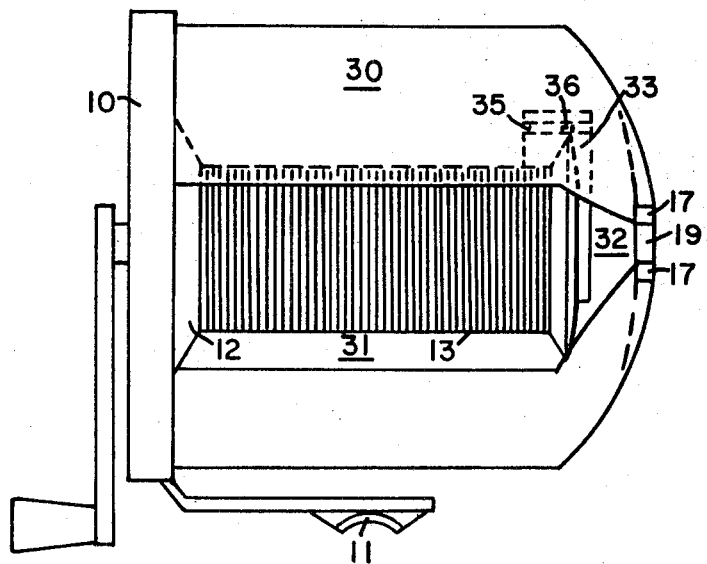
FIG. 6 is a front elevational view of the embodiment of the present invention shown in FIG. 5.

In FIGS. 5 and 6, an embodiment of the present invention is shown wherein a cover 30 is attached to side plate 10 and substantially encloses spool 12. Cover 30 contains the above-described casting adapting means in the end thereof opposite its attachment to side plate 10. An opening 31 is provided in the front of cover 30 to provide for fishing line 13 to pass onto spool 12. Opening 31 extends by means of tapered slot 32 to the open end of casting base plate 15.

With the embodiments of the present invention shown in FIGS. 1 through 6, fishing line 13 may be readily moved from the rewind position to the casting position merely by sweeping the line into contact with base segment 19 of casting dog 16 with sufficient force to cause rotation of casting dog 16 from the open position to the closed position. There is no necessity for picking up the fishing line with the fingers and tediously threading the line into the casting adapting means. As noted above, a simple sweeping motion with a finger or hand is all that is required to move the fishing line 13 from the rewind position to the casting position.

After the cast is complete, fishing line 13 may be readily removed from the casting adapting means by pivoting lever 23, generally by the thumb of the fisherman to release the end thereof from engagement with lug 22. On disengaging lever 23 from lug 22, casting dog 16 is forcefully rotated back to the open position by means of first tension producing means 21. Rotation of casting dog 16 to the open position ejects fishing line 13 from the casting adapting means. As a result of such ejection, as opposed to a mere release, there is less likelihood of fishing line 13 becoming fouled on the fishing reel in returning to the rewind position.

In another useful embodiment of the present invention as illustrated in FIGS. 5 and 6, a braking means for stopping the casting of fishing line 13 from spool 12 is provided. This braking means comprises a lever 33 which is disposed in an opening in the rear of cover 30 and pivotally connected to cover 30 by means of shaft 34. In the event it is desired to use the braking means with a fishing reel which does not include cover 30, as illustrated in FIG. 1, then shaft 34 may be attached to side plate 10 or to a special bracket extending from reel seat plate 11. Lever 33 generally is shaped such that it can be easily "thumbed" by the fisherman. To lever 33 is attached in perpendicular alignment therewith, a slotted shoe 35 having a slot 36 in the edge thereof. The lever 33 is positioned such that slot 36 is in the same plane as the peripheral edge of the free end of spool 12. As the upper end of lever 33 is pivoted forward, slot 36 engages and extends over the peripheral edge of spool 12 thereby stopping the fishing line 13 from spinning off of spool 12.

Figure 7:
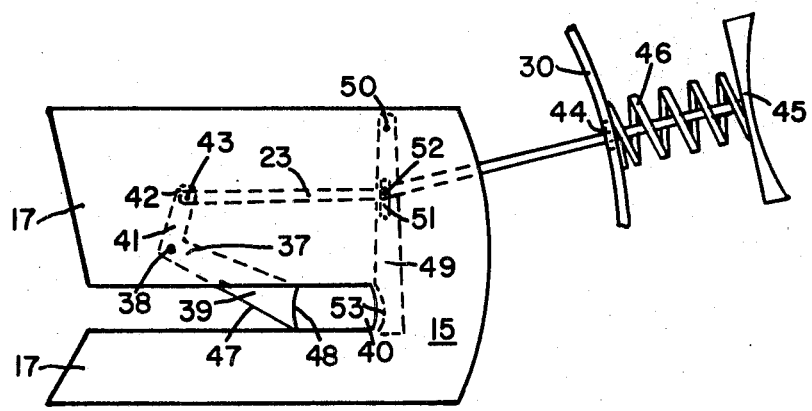
FIG. 7 is a side elevational view of another embodiment of the casting adapting means of the present invention illustrating the casting adapting means in a casting position.
Figure 8:
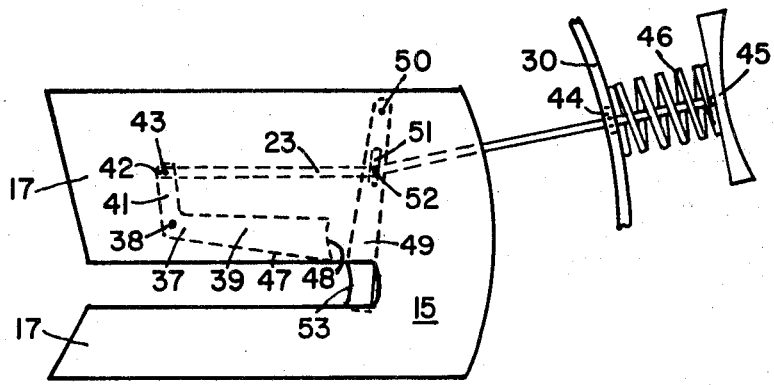
FIG. 8 is a side elevational view of the embodiment of the casting adapting means shown in FIG. 7 illustrating the casting adapting means as it appears when releasing the fishing line from the casting position.

Referring particularly to FIGS. 7 and 8 and the embodiment of the present invention illustrated therein, the casting dog is represented as a generally L-shaped member 37. The L-shaped casting dog 37 is pivotally connected by means of a pin 38 to leg 17 of casting base plate 15. A lower segment 39 of L-shaped casting dog 37 depends downwardly and rearwardly from pin 38 to cross the slot formed by legs 17 of base plate 15 thereby forming a casting eye 40 through which fishing line 13 passes on casting. A generally upward extending segment 41 of L-shaped casting dog 37 extends from pin 38 and is rotatably connected adjacent its upper end 42 by pin 43 to casting dog release lever 23 which extends in a rearward direction from cover 30 and passes through the wall of cover 30 through slot 44. At the outer end of dog release lever 23, a substantially flat knob 45 is provided for receiving the fisherman's thumb for depressing dog release lever 23 forward. A spring 46 is positioned around dog release lever 23 between knob 45 and cover 30 or other suitable base to exert tension on knob 45 and thereby dog release lever 23 to force such lever rearward thereby maintaining casting dog 37 in a closed or casting position.

As fishing line 13 is swept into the opening of casting base plate 15 and into contact with the leading edge 47 of lower segment 39, casting dog 37 is forced to rotate on pin 38 sufficiently to allow fishing line 13 to pass between the lower most edge of lower segment 39 and into casting eye 40. As soon as the pressure exerted by fishing line 13 is released by the fishing line passing into casting eye 40, then the tension exerted by spring 46 returns lower segment 39 to the closed or casting position. Fishing line 13 then is in contact with following edge or end 48 of lower segment 38 which restrains said fishing line in casting eye 40 on casting. End 48 of lower segment 38 extends in general vertical relationship between legs 17 of base plate 15 and preferably has an arcuate edge.

Once casting is complete and it is desired to rewind fishing line 13, knob 45 is depressed thereby causing casting dog 37 to rotate on pivot pin 38 thereby raising the lower end of lower segment 39 and allowing fishing line 13 to pass outward from casting base plate 15. To facilitate removal of fishing line 13 from casting eye 40 upon depression of knob 45, a sweeper arm 49 is provided. Sweeper arm 49 is rotatably connected to casting base plate 15 by pin 50 and slideably connected intermediate its ends to dog release lever 23. Such connection involves a longitudinal slot 51 in sweeper arm 49 through which a pin 52 is engaged with dog release lever 23. The alignment of sweeper arm 49 is such that as dog release lever 23 is depressed, sweeper arm 49 is caused to rotate about pin 50 thereby bringing sweeping edge 53 of sweeper arm 49 into and across casting eye 40 in a generally forward movement. By this movement, sweeping edge 53 contacts and pushes fishing line 13 forward simultaneously with the raising of the lower edge of lower segment 39 of the L-shaped casting dog 37 thereby ejecting fishing line 13 from the casting adapting means and back to normal rewind position.

If desired, a level winding means such as that described and claimed in copending U.S. Pat. application Ser. No. 646,976, filed June 19, 1967, may be disposed in opening 31 of cover 30 to provide for level winding of fishing line 13 onto spool 12 during rewinding operations.

In addition to the embodiments of the present invention specifically described above, many other embodiments may be constructed and operated without departing from the spirit and scope of the present invention. For example, the restraining means may be a substantially straight bar vertically disposed between legs 17 of base plate 15 and rotatably connected intermediate its ends to one of said legs 17. So long as the embodiment provides a restraining means across the opening into the slot of base plate 15 which restraining means is movably responsive to fishing line pressure such as to permit fishing line to pass around said restraining means into casting eye 40 and be restrained therein by said restraining means, such embodiment is within the spirit and scope of the present invention.

I claim:

1. A fishing reel comprising a reel frame adapted for attachment to a fishing rod, a spool rotatably attached at one end thereof to said reel frame, means for rotating said spool, and a casting adapting means adjacent the free end of said spool, said casting adapting means comprising a generally U-shaped base plate opening toward the front of said fishing reel, a line restraining member connected in movable relationship with said base plate and lying across the opening of said base plate, said line restraining member being movably responsive to fishing line pressure against a front edge thereof such as to permit entry of said fishing line into said base plate, means for locking said line restraining member against movement resulting from fishing line pressure against a back edge thereof, means for releasing said locking means to permit said line restraining member to allow said fishing line to leave said casting adapting means and return to normal rewinding line path.

2. The fishing reel of claim 1 wherein said line restraining means comprises a generally U-shaped casting dog rotatably attached to said casting base plate such as to be rotatably responsive to fishing line forced against the base segment of said casting dog.

3. The fishing reel of claim 2 wherein said generally U-shaped casting dog includes a lug extending from said casting dog near the base segment thereof and wherein there is provided a first tension producing means adapted to force said casting dog into substantial alignment with said casting base plate, a dog release lever pivotally connected to said casting base plate and adapted to engage said lug of said casting dog when said casting dog is in closed position, and a second tension producing means in contact with said dog release lever such as to force said dog release lever into engagement with said lug of said casting dog when said casting dog is in closed position.

4. The fishing reel of claim 3 wherein said lug extends from the base segment of casting dog and in a direction substantially parallel with the axis of said base segment.

5. The fishing reel of claim 3 wherein said first tension producing means is a coiled strip of spring metal.

6. The fishing reel of claim 1 wherein said reel frame includes a side plate and a cover substantially enclosing said spool and attached to said side plate at one end thereof and containing said casting adapting means in the other end thereof, said cover being provided with an opening to permit rewinding and casting of fishing line onto and from said spool.

7. The fishing reel of claim 6 wherein said opening in said cover extends from in front of said spool as a tapered slot which opens into said open end of said casting base plate thereby forming a guide for guiding said fishing line into said casting adapting means.

8. The fishing reel of claim 1 wherein said casting base plate comprises two separate U-shaped plates with said line restraining means being rotatably connected thereto and between said two plates.

9. The fishing reel of claim 1 wherein a braking means for stopping the cast of said fishing line from said fishing reel is provided, said braking means comprising a lever pivotally connected to said reel frame behind said spool and having a slotted shoe perpendicularly attached to an end thereof, said lever being positioned such that the slot of said slotted shoe lies in the same plane as does the peripheral edge of the free end of said spool.

10. The fishing reel of claim 1 wherein said line restraining means comprises a generally L-shaped casting dog pivotally attached adjacent the apex thereof to said casting base plate.

11. The fishing reel of claim 10 wherein there is provided a dog release lever rotatably connected adjacent one end thereof to said L-shaped casting dog adjacent the upper end thereof, a tension producing means forcing said L-shaped casting dog into closed position, a sweeper arm operatively connected to said dog release lever such as to rotate an end of said sweeper arm through said opening of said casting base plate on forward depression of said dog release lever.